United States Patent
Fukuta et al.

(10) Patent No.: US 7,300,605 B2
(45) Date of Patent: Nov. 27, 2007

(54) PHOSPHOR AND DEVICE USING THE SAME

(75) Inventors: Shinya Fukuta, Kawasaki (JP);
Toshiaki Onimaru, Kawasaki (JP);
Tomonari Misawa, Kawasaki (JP);
Hironori Sakata, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 306 days.

(21) Appl. No.: 11/089,351

(22) Filed: Mar. 25, 2005

(65) Prior Publication Data

US 2005/0161639 A1 Jul. 28, 2005

(30) Foreign Application Priority Data

Dec. 1, 2004 (JP) ............................. 2004-348778

(51) Int. Cl.
*C09K 11/08* (2006.01)
*C09K 11/80* (2006.01)
*H01J 11/02* (2006.01)

(52) U.S. Cl. .................. 252/301.4 R; 252/301.4 F; 252/301.4 P; 252/301.5

(58) Field of Classification Search ............... 313/486, 313/467, 468; 252/301.4 R, 301.4 F, 301.4 P, 252/301.5, 301.6 R, 301.6 F, 301.6 P
See application file for complete search history.

(56) References Cited

U.S. PATENT DOCUMENTS

| | | | |
|---|---|---|---|
| 4,150,321 A * | 4/1979 | Schetters et al. ........... 313/486 |
| 4,263,164 A | 4/1981 | Swinkels et al. ..... 252/301.4 R |
| 4,354,139 A | 10/1982 | Konijnendijk et al. ...... 313/486 |
| 4,370,595 A | 1/1983 | Willemsen et al. ......... 313/486 |
| 4,606,846 A | 8/1986 | Kahn et al. ........... 252/301.4 R |
| 4,800,319 A | 1/1989 | Van Kemenade et al. .. 313/487 |
| 4,853,354 A * | 8/1989 | Calvat et al. ................. 501/119 |
| 4,902,654 A * | 2/1990 | Aubert et al. ............... 501/117 |
| 4,988,402 A * | 1/1991 | Kokta .................. 252/301.4 R |
| 6,210,605 B1 * | 4/2001 | Srivastava et al. .... 252/301.4 R |
| 6,454,967 B1 * | 9/2002 | Im et al. ............... 252/301.4 R |
| 2003/0173542 A1* | 9/2003 | Fukuta et al. ......... 252/301.4 R |

FOREIGN PATENT DOCUMENTS

| | | |
|---|---|---|
| JP | 5-86366 | 4/1993 |
| JP | 2001-139942 | 5/2001 |
| JP | 2001-322867 | 11/2001 |
| JP | 2003-342566 | 12/2003 |

OTHER PUBLICATIONS

Sommerdijk, et al., "Concentration Dependence of the $Ce^{3+}$ and $Tb^{3+}$ Luminescence of $Ce_{1-x}Tb_x MgAl_{11}O_{19}$", Journal of Luminescence 9 (1974) pp. 415-419.
Sommerdijk, et al., "The Behaviour of Phosphors with Aluminate Host Lattices", Philips Technical Review, vol. 37, 1977, No. 9/10, pp. 221-233.
European Search Report dated Mar. 16, 2006 for corresponding British Patent Application No. 05252040.0-2111.

* cited by examiner

*Primary Examiner*—C. Melissa Koslow
(74) *Attorney, Agent, or Firm*—Staas & Halsey LLP

(57) ABSTRACT

A phosphor having a magnetoplumbite-type crystal structure and comprising at least one element selected from B, Si, P, Ge, Ti, V, Ni, Ta, Nb, Mo, W, Yb, Tm and Bi.

10 Claims, 5 Drawing Sheets

PHOSPHOR AND DEVICE USING THE SAME

CROSS-REFERENCE TO RELATED APPLICATION

This application is related to Japanese application No. 2004-348778 filed on Dec. 1, 2004, whose priority is claimed under 35 USC §119, the disclosure of which is incorporated by reference in its entirety.

BACKGROUND OF THE INVENTION

1. Field of the Invention

The invention relates to a phosphor and a device using the same. More particularly, the invention relates to a phosphor having a magnetoplumbite-type crystal structure by which received light can be converted to lower energy (longer wavelength) light and relates to a device using such a phosphor. The phosphor of the invention can suitably be used for gas discharge devices such as fluorescent lamps and display devices such as plasma display panels (PDPs).

2. Description of the Related Art

Magnetoplumbite-type crystals such as aluminates are used as a typical phosphor along with crystals having a β-alumina-type structure. In order to form green phosphors of such crystals, for example, Tb is very often added to an appropriate phosphor host. Additionally, $Ce^{3+}$ is often used as a sensitizing element for enhancing the emission from $Tb^{3+}$. For example, $CeMgAl_{11}O_{19}$:Tb is such a phosphor with $Ce^{3+}$ and reported in J. Luminescence, 9 (1974), pp. 415-419 or Philips Technical Review, 37 (1977) pp. 221-233.

In such a phosphor, the energy level of the Ce-emitted light is substantially equal to the fd-transition energy of Tb; therefore, the energy transition from Ce to Tb occurs with high efficiency. The excited Tb produces visible light emission based on the $^5D_J \rightarrow {}^7F_{J'}$ transition. More specifically, $^5D_4 \rightarrow {}^7F_5$ transition produces a main peak of green emission at a wavelength of about 540 nm, $^5D_4 \rightarrow {}^7F_6$ produces a sub-peak of blue emission at a wavelength of about 480 nm, $^5D_4 \rightarrow {}^7F_4$ produces a sub-peak of yellow emission at a wavelength of about 580 nm, and $^5D_4 \rightarrow {}^7F_3$ produces a sub-peak of red emission at a wavelength of about 600 nm.

The CIE color coordinate of the light emitted from this phosphor is approximately (0.31, 0.61). In this color coordinate, a y component represents a green component. Concerning the luminescence from the Tb-containing material such as $CeMgAl_{11}O_{19}$:Tb, a y value is at least 0.1 lower than that of the color coordinate of $ZnSi_2O_4$:Mn (0.21, 0.72) or $BaMgAl_{14}O_{23}$:Mn (0.15, 0.73); thus, such green color purity is considerably low.

Methods for improving the color purity of the Tb-containing phosphor are disclosed in Japanese Unexamined Patent Publication Nos. HEI 5(1993)-86366 and 2001-139942. The methods disclosed in these publications include adding Tb and Mn simultaneously to a magnetoplumbite-type crystal so that the color purity can be improved as compared to the material using only Tb.

The former of these publications discloses a phosphor of a formula $(Ce_{1-x}Tb_x)(Mg_{1-a-b}Zn_aMn_b)Al_{2z}O_{2.5+3z}$, wherein $0 < x \leq 0.6$, $0 < a+b < 1$, $4.5 \leq z \leq 15$. This publication suggests that addition of Zn can increase the brightness of the phosphor containing Mn and Tb.

As an extension of the above known technology, the present inventors found that $La^{3+}$ can produce light emission equal to $Ce^{3+}$ when excited by vacuum ultraviolet light. Based on this finding, a phosphor of a formula $(La_{1-x}Tb_x)_y(Mg_{1-a-b}Mn_aZn_b)Al_zO_{1.5(y+Z)+1}$, wherein $0 \leq x \leq 0.5$, $0.8 \leq y \leq 1.2$, $0 < a+b \leq 1$, $8 \leq Z \leq 30$ was invented (Japanese Unexamined Patent Publication No. 2003-342566). This phosphor is characterized by having higher brightness, when excited by vacuum ultraviolet, than the Ce-containing phosphor typically disclosed in Japanese Unexamined Patent Publication No. HEI 5(1993)-86366.

In order to be suitable for PDPs, mercury-free fluorescent lamps and the like, phosphors should further have improved properties as follows:

(1) They should have higher brightness.

(2) For display applications, their phosphorescence (afterglow) component should be as small as possible when they are excited by a 147 nm Xe atomic beam. As used herein, the term "phosphorescence" refers to a luminescence phenomenon remaining after the lapse of tens of milliseconds from the stop of excitation of phosphors. The use of a high-phosphorescence phosphor in display devices can create a problem that an image residue can remain even after displaying an image is stopped. On the other hand, when 172 nm light is used as an excitation source, phosphorescence can be reduced with known phosphors to a practically acceptable level.

Besides the above green phosphors, $LaMgAl_{11}O_{19}$:$Eu^{2+}$ is known as a blue phosphor. This phosphor also produces phosphorescence by vacuum ultraviolet excitation.

Phosphorescence is a weak luminescence phenomenon that occurs when excited electrons, holes and others are accumulated in traps such as defects and emitted by a thermal excitation process to reach a luminescent center. For example, it is detailed in Phosphor Handbook (edited by Phosphor Research Society, Ohmsha Ltd.).

Such a situation that excited carriers are trapped in defects or the like can cause not only phosphorescence but also brightness reduction. A radical solution to such phosphorescence lies in reducing traps such as defects. However, such a solution requires a drastic improvement in manufacturing technology and thus long time for research and development and high cost of development.

SUMMARY OF THE INVENTION

The inventors have made investigations on new additive elements for improving properties with a main object of increasing the probability of excitation of carriers accumulated in defects. As a result, the inventors have found that addition of specific elements can reduce phosphorescence and have made the invention.

Thus, according to the invention, there is provided a phosphor having a magnetoplumbite-type crystal structure and comprising at least one element selected from B, Si, P, Ge, Ti, V, Ni, Ta, Nb, Mo, W, Yb, Tm and Bi.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The inventors have used a variety of phosphors in PDPs to evaluate phosphorescence and, consequently, determined that if the brightness of phosphorescence after 0.1 seconds from when application of 147 nm light is stopped (0.1 second afterglow) is 0.05% or less of the brightness at the time when the application of 147 nm light is stopped, phosphorescence will cause no problems in practical application.

The PDP evaluation of phosphorescence from phosphors involves a lot of waste in terms of time for development; therefore, evaluation has also been made using a phosphor powder. This evaluation method includes the steps of applying vacuum ultraviolet light to a powdered phosphor from a pulse-driving excimer lamp, measuring the emitted light with a photomultiplier (R4632 manufactured by Hamamatsu Photonics K.K.) and measuring the afterglow. In general, the behavior of phosphorescence emission varies with conditions such as excitation power and excitation time. However, it has been demonstrated that a value of about 0.2 to 0.3% obtained with respect to the post-decisecond afterglow in the above-mentioned powder evaluation approximately corresponds to a value of 0.02 to 0.03% obtained with respect to the 0.1 second afterglow in the PDP evaluation. Hereinafter, the post-decisecond afterglow ratio of phosphor powder is used for phosphorescence evaluation.

According to the invention, there can be provided a phosphor whose post-decisecond afterglow ratio is 0.5% or less, further, 0.3% or less while brightness reduction is prevented as far as possible.

Figure 1:
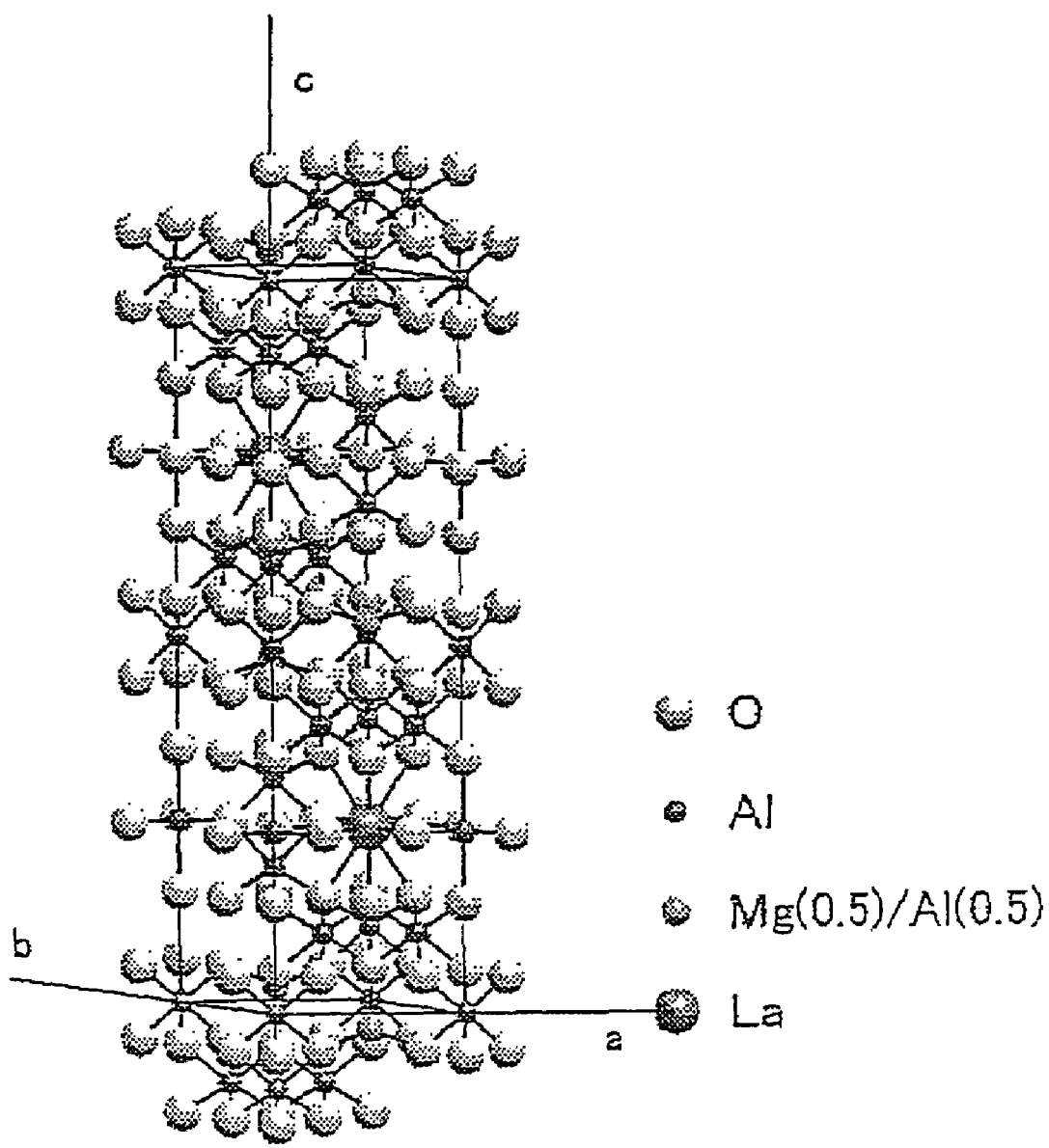
FIG. 1 is a schematic view of the magneto plumbite structure of a phosphor to be used in the present invention.

The phosphor of the invention may be any material that has a magnetoplumbite-type crystal structure (see FIG. 1) and contains at least one element selected from typical elements such as B, Si, P, Ge and Bi and transition metal elements such as Ti, V, Ni, Ta, Nb, Mo, W, Yb and Tm (among which Yb, Tm and the like are also referred to as a rare-earth element). Above element is added to the phosphor for good control of phosphorescence and, thus, hereinafter referred to as "phosphorescence improving element".

Among the phosphorescence improving elements, Ti, V, Cr, Ni, Pr, P, B, Mo, W, Yb, Tm, Si, Ta and Bi are preferred, and Ti, V and Ni are particularly preferred, for good control of phosphorescence. In view of improvement in brightness and good control of phosphorescence, Lu, P, W, Sc, Yb, Bi, Ta, Si and Ge are preferred, and Yb is particularly preferred.

The phosphor comprises a host and an additive element.

The host may be any material that has a magnetoplumbite-type crystal structure. Examples of the element constituting the host include La, Mg, Al, Ca, Sr, Ce, Ba, Zn, Si, Y, B and the like. In particular, phosphors containing at least La are preferred. Specific examples thereof include $LaMgAl_{11}O_{19}$, $La_xAl_yO_z$ (x:y:z=0.5 to 1.2: 11 to 12:18 to 19.5, each representing an element ratio) and the like. This host may also be mixed with any other hosts such as $CaAl_{12}O_{19}$ and $SrAl_{12}O_{19}$ at an approximate ratio to form a mixed crystal.

Examples of the additive element include Tb, Mn, Sc, Cr, Fe, Co, Cu, Zn, Ga, Sr, Y, Zr, Tc, Ru, Rd, Pd, Ag, Cd, In, Sn, Ba, La, Ce, Pr, Nd, Pm, Sm, Eu, Gd, Dy, Ho, Er, Lu, Hf, W, Tl, Pb and the like. In particular, at least one of Tb, Mn and Eu is preferably contained as a luminescent center element. If both Tb and Mn are included, the resulting green phosphor can have improved brightness. If $Eu^{2+}$ is included, the resulting blue phosphor can also have improved brightness. If Zn is used as an auxiliary additive element together with V as the phosphorescence improving element, improvement in brightness and good control of phosphorescence can be achieved more effectively.

A phosphor represented by the formula $(La_{1-x-y}Ln_xLn'_y)(Mg_{1-a-b-\alpha}M_aM'_b)(Al_{11-c+\beta}A'_c)O_{19+\gamma}$ is more preferred. In the formula, Ln and M each represent the luminescent center element, and Ln', M' and A' represent the phosphorescence improving element and a brightness improving element. Ln, M, Ln', M' and A' may each comprise different elements.

In the formula, x is preferably from 0 to 0.5, more preferably from 0.001 to 0.4. It is preferred that x is from 0.001 to 0.4, because more sufficient brightness can be obtained in such a range.

In the formula, y is preferably from 0 to 0.1, more preferably from 0.0001 to 0.1, still more preferably from 0.001 to 0.03. Preferably, y is at least 0.001 because phosphorescence can be more improved, and y is preferably at most 0.03 because more sufficient brightness can be obtained.

In the formula, a is preferably from 0 to 0.2, more preferably from 0 to 0.05. Preferably, a is at most 0.05 because more sufficient brightness can be obtained.

In the formula, b is preferably from 0 to 0.1, more preferably from 0.0001 to 0.1, still more preferably from 0.001 to 0.03. Preferably, b is at least 0.0001 because phosphorescence can be more improved.

In the formula, c is preferably from 0 to 0.1, more preferably from 0.0001 to 0.1, still more preferably from 0.001 to 0.03.

In the formula, $\alpha$, $\beta$ and $\gamma$ are factors for correcting a deviation of Mg, Al and O respectively, which may be caused by defects or the like when the above values are provided. Preferably, $\alpha$, $\beta$ and $\gamma$ are in the range from −1 to 1. Therefore, $\alpha$, $\beta$ and $\gamma$ are controlled to reduce such defect.

In the formula, not all of y, b and c are 0 at the same time.

Preferred elements for Ln, M, Ln', M' and A' are as shown below.

Ln and Ln' are each preferably a rare-earth element such as Tb, Yb, Gd, Y, Ce and Pr or an element that can form a cation with an ionic radius of about 1 to 1.4 angstroms, such as Ca and Sr.

M and M' are each preferably an element that can form a cation with an ionic radius of about 0.7 to 1 angstrom, which is typified by a 3d transition metal such as Mn, Ti, V and Zn.

A' is preferably an element that can form a cation with an ionic radius of at most 0.8 angstrom, such as Ga, Si, B and V (in which V may be any of A', M and M').

Examples of particularly preferred phosphors include:

(1) $(La_{1-x}Tb_x)(Mg_{1-a}Mn_a)(Al_{11-c}V_c)O_{19}$, wherein x is from 0 to 0.5, a is from 0 to 0.1, and c is from 0.0001 to 0.01;

(2) $(La_{1-x-y}Tb_xYb_y)(Mg_{1-a}Mn_a)Al_{11}O_{19}$, wherein x is from 0 to 0.5, y is from 0.0001 to 0.1, and a is from 0 to 0.1;

(3) $(La_{1-x-y}Tb_xSr_y)(Mg_{1-a-b-y}Mn_aZn_b)(Al_{11-c+y}V_c)O_{19}$, wherein x is from 0 to 0.5, y is from 0 to 0.1, a is from 0 to 0.1, b is from 0 to 0.1, and c is from 0.0001 to 0.01 (in this phosphor, Sr has a valence of +2, and therefore Mg and Al are reduced and increased, respectively, for the correction of the deviation with respect to the whole charge);

(4) $(La_{1-x-y-z}Tb_xYb_yGd_z)(Mg_{1-a}Mn_a)Al_{11}O_{19}$, wherein x is from 0 to 0.5, y is from 0.0001 to 0.1, z is from 0.00001 to 0.1, and a is from 0 to 0.1;

(5) $(La_{1-x-y-z}Tb_xYb_yGd_z)(Mg_{1-a-b}Mn_aTi_b)Al_{11}O_{19}$, wherein x is from 0 to 0.5, y is from 0.0001 to 0.1, z is from 0.00001 to 0.1, a is from 0 to 0.1, and b is from 0.00001 to 0.03;

(6) $(La_{1-x-y}Eu_xTm_y)Mg_{1-x}Al_{11+x}O_{19}$, wherein x is from 0.001 to 0.15 and y is from 0.0001 to 0.1; and (7) $(La_{1-x-y-z}Tb_xYb_yLn_z)(Mg_{1-a-b}M_aM'_b)Al_{11}O_{19+d}$, wherein x is from 0 to 0.5, y is from 0.0001 to 0.1, z is from 0.00001 to 0.1, a is from 0 to 0.1, b is from 0.00001 to 0.03, d is from −1 to 1, Ln is a rare-earth element or an element that can form a cation with an ionic radius of 1 to 1.4 angstroms, and M and M' are each an element that can form a cation with an ionic radius of 0.7 to 1 angstrom, which is typified by a 3d transition metal.

The phosphor of the invention may be formed by any known method. For example, specific amounts of compounds containing elements for constituting the host, a luminescent center element(s), and a phosphorescence improving element(s) are weighed such that the desired molar ratios can be achieved, and then the compounds are fired. The resulting sintered phosphor is then crushed and sieved so that a phosphor with a specific particle size can be obtained.

The firing conditions may be adjusted as needed depending on the type of the elements. In general, firing is preferably performed under an inert atmosphere (such as a nitrogen atmosphere) or a reducing atmosphere at a temperature of 1300 to 1600° C. for 1 to 10 hours at atmospheric pressure. For firing at lower temperatures, flux or a reaction accelerator comprising a halide such as $AlF_3$, $MgF_2$, LiF and NaF or a low-melting oxide such as $B_2O_3$ and $P_2O_5$ may be used as long as the effects of the invention is not ruined.

The phosphors of the present invention may be used for luminaries such as fluorescent lamps, display devices such as PDPs, CRTs, fluorescent display tubes and X-ray camera tubes and the like. In the following examples, phosphors according to the present invention are applied to a PDP shown in FIG. 2.

Figure 2:
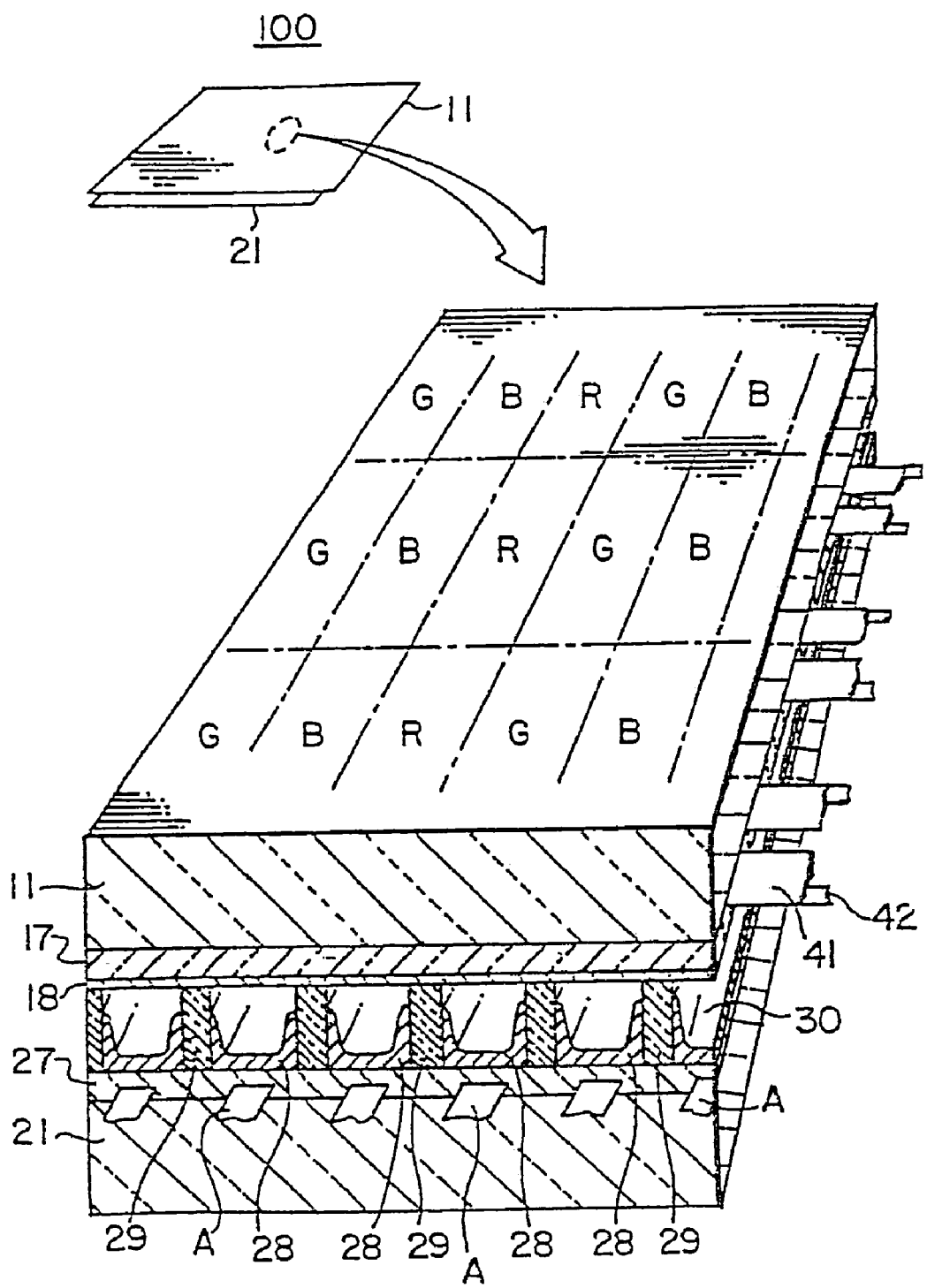
FIG. 2 is a schematic perspective view of a PDP.

FIG. 2 shows an AC-driven surface discharge PDP with three electrodes. The present invention is applicable not only to this type of PDP but also to any type of PDP that has a green phosphor. For example, a PDP may be not only AC-driven but also DC-driven and may be of reflection type or of transmission type.

The PDP 100 of FIG. 2 is composed of a front plate and a rear plate.

First, the front plate usually includes a plurality of display electrodes formed on a substrate 11, a dielectric layer 17 formed to cover the display electrodes and a protecting layer 18 formed on the dielectric layer 17 and exposed to a discharge space.

The substrate 11 is not particularly limited and a glass substrate, a quartz glass substrate, a silicon substrate and the like may be mentioned.

The display electrodes comprise transparent electrodes 41 such as of ITO, and bus electrodes 42 (for example, having a three-layer structure of Cr/Cu/Cr) may be formed on the transparent electrodes 41 for reducing the resistance of the display electrodes.

The dielectric layer 17 is formed of a material commonly used for PDPs. Particularly, the dielectric layer 17 may be formed by applying a paste of a low-melting glass and a binder onto the substrate, followed by sintering.

The protecting layer 18 is provided for protecting the dielectric layer 17 from damage due to ion collision caused by discharge for display operation. The protecting layer 18 may be formed, for example, of MgO, CaO, SrO, BaO or the like.

Next, the rear plate usually includes a plurality of address electrodes A formed on a substrate 21 in a direction perpendicular to the display electrodes, a dielectric layer 27 covering the address electrodes A, a plurality of stripe-shaped ribs 29 formed on the dielectric layer 27 between the address electrodes A and phosphor layers 28 formed between the ribs 29 and also covering sidewalls of the ribs.

The substrate 21 and the dielectric layer 27 may be formed of the same materials as those of the substrate 11 and the dielectric layer 17 of the front plate.

The address electrode A is formed, for example, of a metal layer of Al, Cr, Cu or the like or a three-layer structure of Cr/Cu/Cr.

The ribs 29 can be formed by applying a paste of a low-melting glass and a binder onto the dielectric layer 27, followed by drying, and cutting the dried paste by sandblasting. If a photosensitive resin is used as the binder, the ribs 29 can also be formed by exposing and developing the paste using a mask of a desired configuration, followed by sintering.

Referring to FIG. 2, the phosphor layers 28 are formed between the ribs 29. The phosphor of the present invention can be used as a material for the phosphor layers 28. A method for forming the phosphor layers 28 is not particularly limited, but may be a known method. For example, the phosphor layers 28 may be formed by applying a paste of the phosphor dispersed in a solution of a binder in a solvent between the ribs 29 and sintering the paste in the atmosphere.

Next, the front plate and the rear plate are assembled opposedly to each other with the display electrodes (41, 42) crossing the address electrodes A and with the display and address electrodes inside, and a discharge gas is fed into a space 30 defined by the ribs 29. Thus the PDP 100 is produced.

In the above-described PDP, among the ribs, the dielectric layer and the protecting layer which define the discharge space, the phosphor layers are formed on the ribs and the dielectric layer on the rear plate, but phosphor layers may be formed on the protecting film on the front plate in the same manner.

EXAMPLES

The invention will be further described with reference to examples below, which are not intended to limit the scope of the invention.

Example 1

Each starting mixture was kept under a nitrogen atmosphere at 1400° C. for 4 hours. The fired material was gently pulverized and then kept again under a nitrogen atmosphere at 1400° C. for 4 hours, so that each phosphor as shown in Tables 1 and 2 was prepared. Tables 1 and 2 show phosphors in which various elements are added at about 0.3% to 10% to La and/or Mg of a basis, $(La_{0.6}Tb_{0.4})(Mg_{0.97}Mn_{0.03})Al_{11}O_{19}$. Tables 1 and 2 also show their brightness upon 147 nm excitation, their 1/10 persistence time and their post-decisecond afterglow ratio. In Tables 1 and 2, the 0.1 second afterglow is expressed as a ratio to the brightness at the time of excitation, which is normalized as 1. The 1/10 persistence time means a time by which the brightness at the time of light application decreases to 1/10 after the light application is stopped. The post-decisecond afterglow ratio means the ratio of the afterglow after 0.1 second lapse to the regular glow under the excitation of the phosphor. In the tables, LAM means $LaMgAl_{11}O_{19}$.

TABLE 1

|    | phosphor | normalized brightness | 1/10 persistence time (ms) | post-decisecond afterglow ratio |
|---|---|---|---|---|
| 1  | LAM: 3% Mn, 40% Tb | 1.000 | 19.1 | 0.01065 |
| 2  | LAM: 3% Mn, 40% Tb, 0.1% Y | 1.053 | 19.4 | 0.009749 |
| 3  | LAM: 3% Mn, 40% Tb, 0.3% Y | 1.146 | 19 | 0.010073 |
| 4  | LAM: 3% Mn, 40% Tb, 1% Y | 1.086 | 19.4 | 0.010378 |
| 5  | LAM: 3% Mn, 40% Tb, 3% Y | 1.150 | 19.8 | 0.010518 |
| 6  | LAM: 3% Mn, 40% Tb, 0.1% Ce | 1.003 | 20 | 0.0104 |
| 7  | LAM: 3% Mn, 40% Tb, 0.3% Ce | 0.999 | 19.5 | 0.01042 |
| 8  | LAM: 3% Mn, 40% Tb, 1% Ce | 0.964 | 19.7 | 0.01019 |
| 9  | LAM: 3% Mn, 40% Tb, 3% Ce | 0.919 | 18.6 | 0.008531 |
| 10 | LAM: 1.5% Mn, 35% Tb, 0.3% Pr | 0.957 | 18.8 | 0.0106 |
| 11 | LAM: 1.5% Mn, 35% Tb, 1% Pr | 0.498 | 18.6 | 0.0119 |
| 12 | LAM: 1.5% Mn, 35% Tb, 3% Pr | 0.539 | 17.6 | 0.0133 |
| 13 | LAM: 3% Mn, 40% Tb, 0.3% Nd | 0.901 | 18 | 0.008221 |
| 14 | LAM: 3% Mn, 40% Tb, 1% Nd | 0.626 | 16.2 | 0.008805 |
| 15 | LAM: 3% Mn, 40% Tb, 3% Nd | 0.331 | 15.2 | 0.013673 |
| 16 | LAM: 3% Mn, 40% Tb, 0.3 $Sm^{3+}$ | 0.664 | 16 | 0.002434 |
| 17 | LAM: 3% Mn, 40% Tb, 1% $Sm^{3+}$ | 0.533 | 13.9 | 0.001523 |
| 18 | LAM: 3% Mn, 40% Tb, 3% $Sm^{3+}$ | 0.329 | 13.4 | 0.003768 |
| 19 | LAM: 3% Mn, 40% Tb, 0.1% $Eu^{3+}$ | 0.932 | 19.4 | 0.008433 |
| 20 | LAM: 3% Mn, 40% Tb, 0.3% $Eu^{3+}$ | 0.857 | 18.5 | 0.005445 |
| 21 | LAM: 3% Mn, 40% Tb, 1% $Eu^{3+}$ | 0.753 | 17.9 | 0.00126 |
| 22 | LAM: 3% Mn, 40% Tb, 3% $Eu^{3+}$ | 0.330 | 15.5 | 0.001202 |
| 23 | LAM: 3% Mn, 40% Tb, 0.3% Gd | 1.155 | 18.8 | 0.009876 |
| 24 | LAM: 3% Mn, 40% Tb, 1% Gd | 1.116 | 18.8 | 0.009612 |
| 25 | LAM: 3% Mn, 40% Tb, 3% Gd | 1.108 | 19 | 0.009562 |
| 26 | LAM: 3% Mn, 40% Tb, 0.3% Dy | 0.973 | 17.4 | 0.006062 |
| 27 | LAM: 3% Mn, 40% Tb, 1% Dy | 0.842 | 16.2 | 0.003964 |
| 28 | LAM: 3% Mn, 40% Tb, 3% Dy | 0.683 | 16 | 0.004641 |
| 29 | LAM: 3% Mn, 40% Tb, 0.3% Ho | 0.932 | 18.2 | 0.007611 |
| 30 | LAM: 3% Mn, 40% Tb, 1% Ho | 0.679 | 16 | 0.00609 |
| 31 | LAM: 3% Mn, 40% Tb, 3% Ho | 0.430 | 15.6 | 0.008849 |
| 32 | LAM: 3% Mn, 40% Tb, 0.3% Er | 1.004 | 18.2 | 0.008556 |
| 33 | LAM: 3% Mn, 40% Tb, 1% Er | 0.755 | 16.8 | 0.00702 |
| 34 | LAM: 3% Mn, 40% Tb, 3% Er | 0.513 | 15.4 | 0.007851 |
| 35 | LAM: 3% Mn, 40% Tb, 0.3% Tm | 1.001 | 18 | 0.00715 |
| 36 | LAM: 3% Mn, 40% Tb, 1% Tm | 0.872 | 16.4 | 0.00342 |
| 37 | LAM: 3% Mn, 40% Tb, 3% Tm | 0.690 | 15.4 | 0.00242 |
| 38 | LAM: 3% Mn, 40% Tb, 0.3% $Yb^{3+}$ | 1.070 | 19 | 0.006307 |
| 39 | LAM: 3% Mn, 40% Tb, 1% $Yb^{3+}$ | 0.968 | 18.4 | 0.002928 |
| 40 | LAM: 3% Mn, 40% Tb, 3% $Yb^{3+}$ | 0.828 | 17.8 | 0.001642 |
| 41 | LAM: 3% Mn, 40% Tb, 0.3% $Yb^{2+}$ | 0.939 | 18.1 | 0.005814 |
| 42 | LAM: 3% Mn, 40% Tb, 1% $Yb^{2+}$ | 0.801 | 17.4 | 0.002039 |
| 43 | LAM: 3% Mn, 40% Tb, 3% $Yb^{2+}$ | 0.519 | 17.2 | 0.000996 |

TABLE 2

|    | phosphor | normalized brightness | 1/10 persistence time (ms) | post-decisecond afterglow ratio |
|---|---|---|---|---|
| 1  | LAM: 3% Mn, 40% Tb | 1.000 | 19.1 | 0.01065 |
| 44 | LAM: 3% Mn, 40% Tb, 0.3% Lu | 1.144 | 19.7 | 0.01178 |
| 45 | LAM: 3% Mn, 40% Tb, 1% Lu | 1.168 | 20.2 | 0.01162 |
| 46 | LAM: 3% Mn, 40% Tb, 3% Lu | 1.128 | 20.4 | 0.01203 |

TABLE 2-continued

| | phosphor | normalized brightness | 1/10 persistence time (ms) | post-decisecond afterglow ratio |
|---|---|---|---|---|
| 47 | LAM: 3% Mn, 40% Tb, 0.3% Ti | 0.936 | 18.4 | 0.0046 |
| 48 | LAM: 3% Mn, 40% Tb, 1% Ti | 0.630 | 15.4 | 0.0003 |
| 49 | LAM: 3% Mn, 40% Tb, 3% Ti | 0.233 | 12.8 | 0.0002 |
| 50 | LAM: 3% Mn, 40% Tb, 0.3% V | 0.709 | 15.8 | 0.0023 |
| 51 | LAM: 3% Mn, 40% Tb, 1% V | 0.376 | 13.1 | 0.0001 |
| 52 | LAM: 3% Mn, 40% Tb, 0.3% Ni | 0.982 | 18 | 0.0064 |
| 53 | LAM: 3% Mn, 40% Tb, 1% Ni | 0.592 | 14.6 | 0.0015 |
| 54 | LAM: 3% Mn, 35% Tb, 0.3% Ta | 1.032 | 18.6 | 0.0085 |
| 55 | LAM: 3% Mn, 35% Tb, 1% Ta | 0.918 | 18.4 | 0.0064 |
| 56 | LAM: 3% Mn, 35% Tb, 3% Ta | 0.835 | 18.6 | 0.0068 |
| 57 | LAM: 3% Mn, 40% Tb, 0.3% Mo | 1.010 | 18.5 | 0.0094 |
| 58 | LAM: 3% Mn, 40% Tb, 1% Mo | 0.929 | 17.3 | 0.0077 |
| 59 | LAM: 3% Mn, 40% Tb, 3% Mo | 0.628 | 15.7 | 0.0043 |
| 60 | LAM: 3% Mn, 40% Tb, 0.3% W | 1.069 | 18.4 | 0.0106 |
| 61 | LAM: 3% Mn, 40% Tb, 1% W | 0.976 | 17.6 | 0.0101 |
| 62 | LAM: 3% Mn, 40% Tb, 3% W | 0.930 | 17.9 | 0.0106 |
| 63 | LAM: 3% Mn, 40% Tb, 0.3% P | 1.097 | 18.6 | 0.0110 |
| 64 | LAM: 3% Mn, 40% Tb, 1% P | 0.987 | 18.2 | 0.0107 |
| 65 | LAM: 3% Mn, 40% Tb, 3% P | 1.010 | 18 | 0.0110 |
| 66 | LAM: 3% Mn, 40% Tb, 3% B | 0.883 | 17.2 | 0.0104 |
| 67 | LAM: 3% Mn, 40% Tb, 10% B | 0.802 | 17.3 | 0.0097 |
| 68 | LAM: 3% Mn, 40% Tb, 30% B | 0.792 | 17.4 | 0.0102 |
| 69 | LAM: 3% Mn, 40% Tb, 0.3% Si | 1.112 | 19.6 | 0.0105 |
| 70 | LAM: 3% Mn, 40% Tb, 1% Si | 1.100 | 18.6 | 0.0102 |
| 71 | LAM: 3% Mn, 40% Tb, 3% Si | 0.977 | 17.2 | 0.0094 |
| 72 | LAM: 3% Mn, 40% Tb, 0.3% Ge | 1.042 | 19.6 | 0.0109 |
| 73 | LAM: 3% Mn, 40% Tb, 1% Ge | 0.985 | 19 | 0.0097 |
| 74 | LAM: 3% Mn, 40% Tb, 3% Ge | 0.949 | 19 | 0.0070 |
| 75 | LAM: 3% Mn, 35% Tb, 0.3% Nb | 0.956 | 18.2 | 0.0079 |
| 76 | LAM: 3% Mn, 35% Tb, 1% Nb | 0.945 | 18.2 | 0.0083 |
| 77 | LAM: 3% Mn, 35% Tb, 3% Nb | 0.902 | 18.4 | 0.0086 |
| 78 | LAM: 3% Mn, 40% Tb, 0.3% Bi | 1.049 | 19.4 | 0.0113 |
| 79 | LAM: 3% Mn, 40% Tb, 1% Bi | 1.002 | 18.2 | 0.0098 |
| 80 | LAM: 3% Mn, 40% Tb, 3% Bi | 0.982 | 19 | 0.0094 |

The above tables indicate that addition of Yb, Tm, Ti, V, Ni, Ta, Nb, Mo, Bi or Ge can provide good control of the phosphorescence expressed as post-decisecond afterglow ratio. Among these phosphorescence improving elements, Yb is superior because brightness reduction is relatively small.

Figure 3:
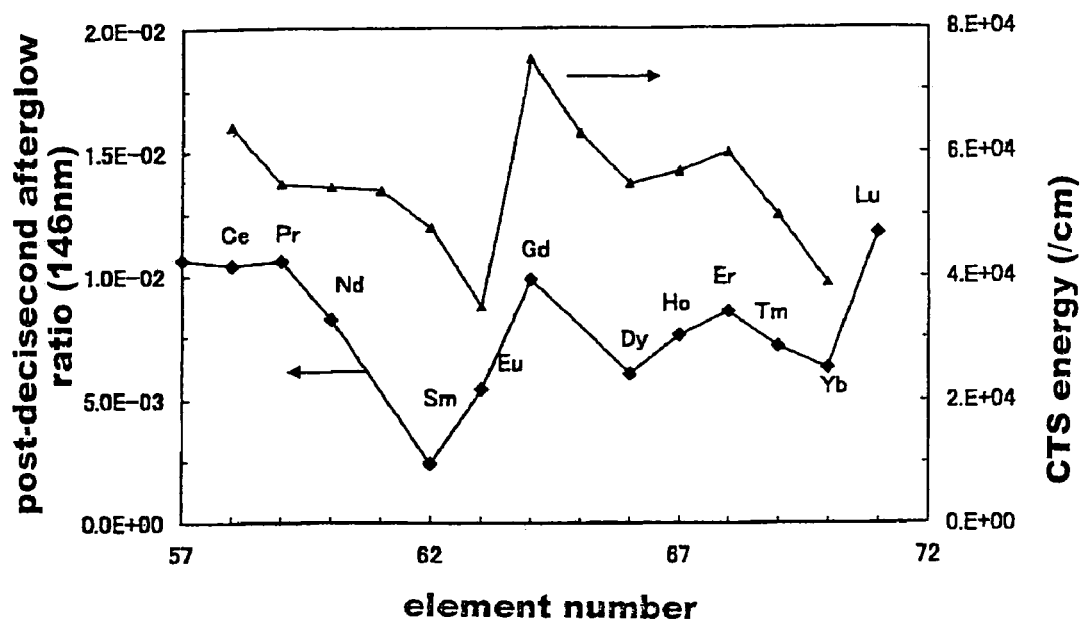
FIG. 3 is a graph showing the relation between element number and post-decisecond afterglow ratio/CTS energy.

FIG. 3 shows post-decisecond afterglow ratio of phosphor Nos. 7, 10, 13, 16, 20, 23, 26, 29, 32, 35, 38 and 44 in the order of increasing element number of these phosphorescence improving elements. These phosphors are represented by the formula $(La_{0.597}Tb_{0.4}Ln_{0.003})(Mg_{0.97}Mn_{0.03})Al_{11}O_{19}$, wherein Ln is Ce, Pr, Nd, Sm, Eu, Gd, Dy, Ho, Er, Tm, Yb, or Lu, in which 0.003 atomic percent of La of $(La_{0.6}Tb_{0.4})(Mg_{0.97}Mn_{0.03})Al_{11}O_{19}$ are replaced with another rare-earth element. FIG. 3 also shows charge-transfer transition (CTS) energy of above each rare-earth element as listed in Phosphor Handbook (1999) p. 184 (published by CRC Press LLC), exclusive of Pm which is a radioactive element.

FIG. 3 indicates that the phosphorescence improvement by addition of the rare-earth elements has a similar tendency to the variation of CTS energy in the order of increasing element number. The inventors have unexpectedly found this tendency. Among the phosphors shown in FIG. 3, it is also apparent from Tables 1 and 2 that Ce, Pr, Eu, Gd, Tm, Yb or Lu can provide a relatively small reduction in brightness when the materials are compared with phosphor No. 1 without these additives. This should be because the non-radiative loss by multiphonon emission is relatively small.

LAM:Mn,Tb (wherein ":" means that La and Mg in LAM is partially replaced with the elements (Mn, Tb) following ":") was also measured for thermal luminescence and, as a result, the findings below were obtained.

(1) LAM:Mn,Tb formed by solid phase reaction has at least two types of phosphorescence-producing defects.

(2) Among the phosphorescence improving elements, Yb, Tm or the like can improve high energy defect-induced phosphorescence, and Ti, V, Ni or the like can improve low energy defect-induced phosphorescence.

The findings suggest that the use of different phosphorescence improving elements based on the type of energy defect can provide better control of phosphorescence.

Tables 1 and 2 show that the addition of Tm, Ti, V, Ni, Mo, W, P, B, Si or Nb can provide better control of the afterglow property expressed as ¹/₁₀ persistence time. Among these phosphorescence improving elements, Ti, V and Si are superior because they can produce shorter ¹/₁₀ afterglow time.

The above concept for the reduction in post-decisecond afterglow ratio and ¹/₁₀ persistence time would be applied to all magnetoplumbite-type crystal structured phosphors including LAM:Mn,Tb. For example, the concept may be applied to blue phosphors comprising LAM:$Eu^{2+}$. It should be noted, however, that since such blue phosphors are generally produced under a reducing atmosphere, typical elements or rare-earth elements, which are relatively resistant to reduction, should be preferred as the phosphorescence improving element to transition metals, which are relatively sensitive to reduction. Tm and Yb are particularly preferred.

Brightness improvements depend on the energy transmission of the phosphorescence improving element and the luminescent center element. Thus, when the phosphorescence improving element is added to any other system as described above, the type and amount of both elements should be reexamined.

If any other element for improving any other property is added together with the phosphorescence improving element, different properties can be improved. For example, if both V for reducing phosphorescence and Zn effective for brightness improvement (for example, see Japanese Unexamined Patent Publication No. 2003-342566) are added, good control of phosphorescence and brightness improvement can be achieved at the same time.

Example 2

Phosphors represented by the formula $(La_{1-x}Tb_x)(Mg_{1-a}Mn_a)(Al_{11-c}V_c)O_{19}$ were prepared by the process as shown below. The valence of V has not been determined yet and is assumed to be 3 for the sake of convenience in the example. Concerning the phosphors represented by the formula, x was set at 0.4, a was set at 0.03, and c was changed in the range from 0 to 0.01 (for example, set at 0, 0.001, 0.002, 0.003, 0.004, 0.005 or 0.01).

When c was 0.002, a proper amount of ethanol was added to the materials in the ratios shown below, and mixing was performed for 3 hours.

TABLE 3

| material | molar ratio |
| --- | --- |
| $Al_2O_3$ | 5.499 |
| MgO | 0.97 |
| $La_2O_3$ | 0.3 |
| $Tb_2O_3$ | 0.2 |
| $MnCO_3$ | 0.03 |
| $V_2O_3$ | 0.001 |
| $MgF_3$ | 0.015 |

Figure 4:
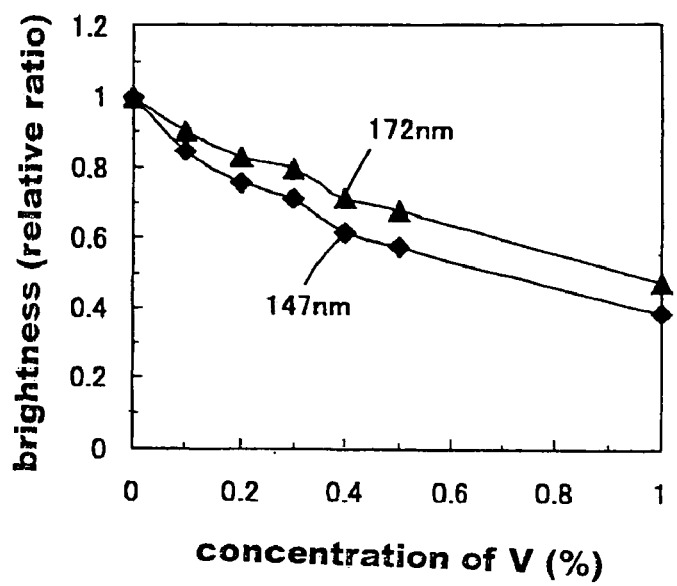
FIG. 4 is a graph showing the relation between brightness and the concentration of V of phosphors of Example 2 of in accordance with the present invention.
Figure 5:
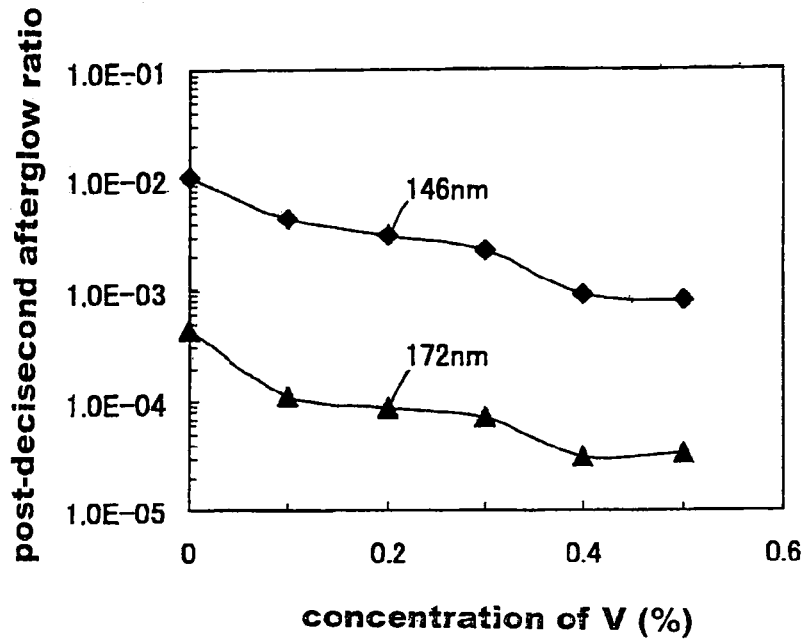
FIG. 5 is a graph showing the relation between post-decisecond afterglow ratio and the concentration of V of phosphors of Example 2 of in accordance with the present invention.

The mixture was kept under a nitrogen atmosphere or a weak reducing atmosphere (specifically an atmosphere of a mixture of nitrogen gas and 0.01 to 10% of hydrogen) at 1400° C. for 4 hours. The fired material was gently pulverized and then kept again under the nitrogen atmosphere or the weak reducing atmosphere at 1400° C. for 4 hours to give a phosphor. The adjustment of c was performed by increasing or decreasing the molar ratio of $Al_2O_3$. FIGS. 4 and 5 show the brightness and 0.1 second afterglow of each resulting phosphor in the case that the material is excited by 146 nm and 172 nm vacuum ultraviolet beams, respectively. In FIG. 4, brightness is expressed as relative brightness, which was calculated relative to the brightness of the V-free phosphor (c=0).

FIG. 4 indicates that as c increases by 0.001, the brightness decreases by about 10%, while FIG. 5 shows that as c increases by 0.001, the post-decisecond afterglow ratio decreases to about 50%.

Example 3

Phosphors represented by the formula $(La_{1-x-y}Tb_xYb_y)(Mg_{1-a}Mn_a)Al_{11}O_{19}$ were prepared by the process as shown below. Concerning the phosphors represented by the formula, x was set at 0.4, a was set at 0.03, and y was changed in the range from 0 to 0.01 (for example, set at 0, 0.001, 0.002, 0.003, 0.005, 0.007 or 0.01).

When y was 0.01, a proper amount of ethanol was added to the materials in the ratios shown below, and mixing was performed for 3 hours.

TABLE 4

| material | molar ratio |
| --- | --- |
| $Al_2O_3$ | 5.5 |
| MgO | 0.97 |
| $La_2O_3$ | 0.295 |
| $Tb_2O_3$ | 0.2 |
| $MnCO_3$ | 0.03 |
| $Yb_2O_3$ | 0.005 |
| $MgF_3$ | 0.015 |

Figure 6:
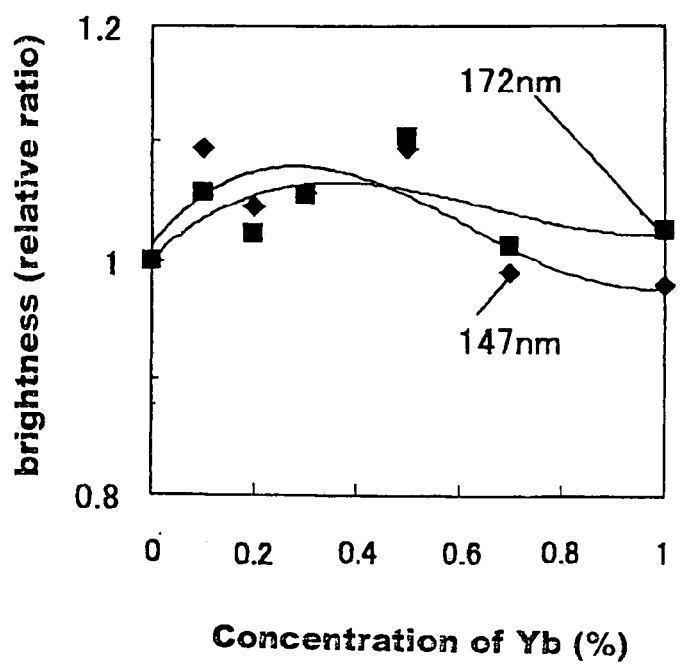
FIG. 6 is a graph showing the relation between brightness and the concentration of Yb of phosphors of Example 3 of in accordance with the present invention.
Figure 7:
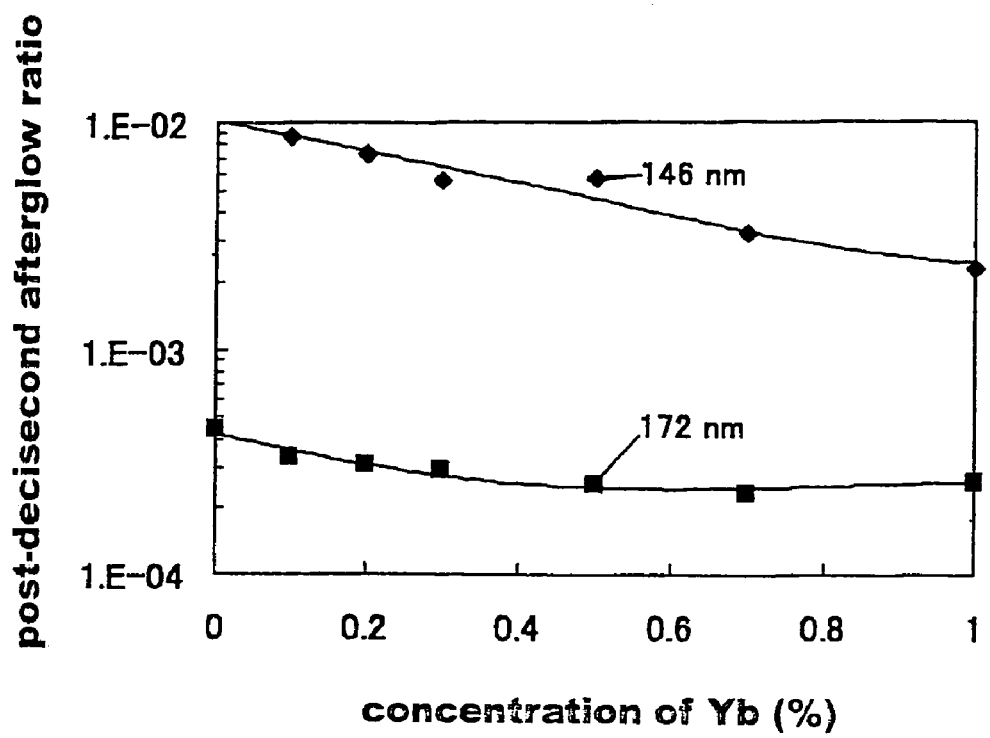
FIG. 7 is a graph showing the relation between post-decisecond afterglow ratio and the concentration of Yb of phosphors of Example 3 of in accordance with the present invention.

The mixture was kept under a nitrogen atmosphere or a weak reducing atmosphere (specifically an atmosphere of a mixture of nitrogen gas and 0.01 to 10% of hydrogen) at 1400° C. for 4 hours. The fired material was gently pulverized and then kept again under the nitrogen atmosphere or the weak reducing atmosphere at 1400° C. for 4 hours to give a phosphor. The adjustment of y was performed by increasing or decreasing the molar ratio of $La_2O_3$. FIGS. 6 and 7 show the brightness and post-decisecond afterglow ratio of each resulting phosphor in the case that the material is excited by 146 nm and 172 nm vacuum ultraviolet beams, respectively. In FIG. 6, brightness is expressed as relative brightness, which was calculated relative to the brightness of the Yb-free phosphor (c=0).

FIG. 6 shows that the brightness of the phosphor with an Yb ratio of 0.01 at a wavelength of 147 nm and 172 nm are substantially equal to or higher than that of the Yb-free phosphor. FIG. 7 shows that the post-decisecond afterglow ratio of the material with an Yb ratio of 0.01 at 147 nm is as low as 0.3%, which is about ⅓ of the Yb-free phosphor.

A comparison between FIGS. 4 and 5 and FIGS. 6 and 7 shows that Yb produces a smaller reduction in post-decisecond afterglow ratio than V but can prevent brightness reduction or improve brightness. Thus, Yb is an element that can achieve brightness improvement and good control of phosphorescence at the same time.

Using the phosphor in which y was 0.01, a PDP configured as shown below was prepared. For comparison, a PDP with a phosphor of $Zn_2SiO_4$:Mn was also prepared.

Configuration of the PDP
  Display electrodes
  Transparent electrode width: 280 μm
  Bus electrode width: 100 μm
  Discharge gap between display electrodes: 100 μm
  Thickness of dielectric layer: 30 μm
  Height of ribs: 100 μm
  Pitch of ribs: 360 μm
  Discharge gas: Ne—Xe (5%)
  Gas pressure: 500 Torr As a result of visual evaluation, the level of the phosphorescence from the PDP with the phosphor in which y was 0.01 was substantially equal to that from the PDP with $Zn_2Si_4$:Mn.

Example 4

A phosphor represented by the formula $(La_{0.57}Tb_{0.4}Sr_{0.03})(Mg_{0.937}Mn_{0.03}Zn_{0.002})(Al_{11.029}V_{0.001})O_{19}$ was prepared by the process as shown below.

A proper amount of ethanol was added to the materials in the ratios shown below, and mixing was performed for 3 hours.

TABLE 5

| material | molar ratio |
| --- | --- |
| $Al_2O_3$ | 5.5145 |
| MgO | 0.937 |
| $La_2O_3$ | 0.285 |
| $Tb_2O_3$ | 0.2 |
| $MnCO_3$ | 0.03 |
| $SrCO_3$ | 0.03 |
| ZnO | 0.002 |
| $V_2O_3$ | 0.0005 |
| $MgF_3$ | 0.015 |

The mixture was kept under a nitrogen atmosphere or a weak reducing atmosphere (specifically an atmosphere of a mixture of nitrogen gas and 0.01 to 10% of hydrogen) at 1400° C. for 4 hours. The fired material was gently pulverized and then kept again under the nitrogen atmosphere or the weak reducing atmosphere at 1400° C. for 4 hours to give a phosphor.

The brightness of the resulting phosphor at a wavelength of 147 nm and 172 nm were substantially equal to that of a Zn, Sr and V-free phosphor, $(La_{0.6}Tb_{0.4})(Mg_{0.97}Mn_{0.03})Al_{11}O_{19}$. This is because the brightness reduction by V addition is compensated for by addition of Zn and Sr. The post-decisecond afterglow ratio of the resulting material at 146 nm was as low as 0.6%, which was about ½ of that of the Zn, Sr and V-free phosphor.

Example 5

A phosphor represented by the formula $(La_{0.587}Tb_{0.4}Yb_{0.01}Gd_{0.003})(Mg_{0.97}Mn_{0.03})Al_{11}O_{19}$ was prepared by the process as shown below.

A proper amount of ethanol was added to the materials in the ratios shown below, and mixing was performed for 3 hours.

TABLE 6

| material | molar ratio |
| --- | --- |
| $Al_2O_3$ | 5.5 |
| MgO | 0.97 |
| $La_2O_3$ | 0.2935 |
| $Tb_2O_3$ | 0.2 |
| $MnCO_3$ | 0.03 |
| $Yb_2O_3$ | 0.005 |
| $Gd_2O_3$ | 0.0015 |
| $MgF_3$ | 0.015 |

The mixture was kept under a nitrogen atmosphere or a weak reducing atmosphere (specifically an atmosphere of a mixture of nitrogen gas and 0.01 to 10% of hydrogen) at 1400° C. for 4 hours. The fired material was gently pulverized and then kept again under the nitrogen atmosphere or the weak reducing atmosphere at 1400° C. for 4 hours to give a phosphor.

The brightness of the resulting phosphor at a wavelength of 147 nm and 172 nm were about 10% higher than that of a Yb and Gd-free phosphor, $(La_{0.6}Tb_{0.4})(Mg_{0.97}Mn_{0.03})Al_{11}O_{19}$. The post-decisecond afterglow ratio of the resulting material at 146 nm was also as low as 0.3%, which was about ⅓ of that of the Yb and Gd-free phosphor.

A PDP was prepared using the process of Example 3 except that the resulting phosphor was alternatively used. The level of the phosphorescence from the resulting PDP was substantially equal to that from the PDP with $Zn_2Si_4$:Mn.

Example 6

A phosphor represented by the formula $(La_{0.594}Tb_{0.4}Yb_{0.003}Gd_{0.003})(Mg_{0.969}Mn_{0.03}Ti_{0.001})A_{11}O_{19}$ was prepared by the process as shown below.

A proper amount of ethanol was added to the materials in the ratios shown below, and mixing was performed for 3 hours.

TABLE 7

| material | molar ratio |
| --- | --- |
| $Al_2O_3$ | 5.5 |
| MgO | 0.969 |
| $La_2O_3$ | 0.297 |
| $Tb_2O_3$ | 0.2 |
| $MnCO_3$ | 0.03 |
| $Yb_2O_3$ | 0.0015 |
| $Gd_2O_3$ | 0.0015 |
| $Ti_2O_3$ | 0.0005 |
| $MgF_3$ | 0.015 |

The mixture was kept under a nitrogen atmosphere or a weak reducing atmosphere (specifically an atmosphere of a mixture of nitrogen gas and 0.01 to 10% of hydrogen) at 1400° C. for 4 hours. The fired material was gently pulverized and then kept again under the nitrogen atmosphere or the weak reducing atmosphere at 1400° C. for 4 hours to give a phosphor.

The brightness of the resulting phosphor at a wavelength of 147 nm and 172 nm were about 15% higher than that of a Yb, Gd and Ti-free phosphor, $(La_{0.6}Tb_{0.4})(Mg_{0.97}Mn_{0.03})Al_{11}O_{19}$. The post-decisecond afterglow ratio of the resulting material at 146 nm was also as low as 0.3%, which was about ⅓ of that of the Yb, Gd and Ti-free phosphor.

A PDP was prepared using the process of Example 3 except that the resulting phosphor was alternatively used. As a result of visual evaluation, the level of the phosphorescence from the resulting PDP was substantially equal to that from the PDP with $Zn_2Si_4$:Mn.

Example 7

A phosphor represented by the formula $(La_{0.989}Eu_{0.01}Tm_{0.001})MgAl_{11}O_{19}$ was prepared by the process as shown below.

A proper amount of ethanol was added to the materials in the ratios shown below, and mixing was performed for 3 hours.

TABLE 8

| material | molar ratio |
| --- | --- |
| $Al_2O_3$ | 5.505 |
| MgO | 0.99 |
| $La_2O_3$ | 0.4945 |
| $Eu_2O_3$ | 0.005 |
| $Tm_2O_3$ | 0.0005 |
| $MgF_3$ | 0.015 |

The mixture was kept under a nitrogen atmosphere or a weak reducing atmosphere (specifically an atmosphere of a mixture of nitrogen gas and 0.01 to 10% of hydrogen) at 1400° C. for 4 hours. The fired material was gently pulverized and then kept again under the nitrogen atmosphere or the weak reducing atmosphere at 1400° C. for 4 hours to give a phosphor.

The brightness of the resulting phosphor at a wavelength of 147 nm and 172 nm were substantially equal to that of a Tm-free phosphor, $(La_{0.989}Eu^{2+}{}_{0.01})MgAl_{11}O_{19}$. The post-decisecond afterglow ratio of the resulting material at 146 nm was also as low as 0.36%, while that of the Tm-free phosphor was 0.59%.

Another phosphor was prepared using the above process except that the Tm and La ratios were set at 0.003 and 0.987, respectively, and it was demonstrated that the resulting brightness was 10% higher than that of the Tm-free phosphor. This indicates that Tm has the capability of increasing brightness as well as that of improving phosphorescence.

A PDP was prepared using the process of Example 3 except that the resulting phosphor was alternatively used. The level of the phosphorescence from the resulting PDP was substantially equal to that from the PDP with $BaMgAl_{10}O17$: $Eu^{2+}$, which is typical blue-omitting phosphor for PDPs.

Since the phosphor of the invention contains at least one element selected from B, Si, P, Ge, Ti, V, Ni, Ta, Nb, Mo, W, Yb, Tm and Bi, it can produce less phosphorescence than the conventional phosphors having a magnetoplumbite-type crystal structure.

The phosphor of the invention can suitably be used for gas discharge devices such as fluorescent lamps and display devices such as plasma display panels (PDPs).

What is claimed is:

1. A phosphor having a magnetoplumbite-type crystal structure and comprising at least one element selected from B, Si, P, Ge, Ti, V, Ni, Ta, Nb, Mo, W, Yb, Tm and Bi, the phosphor being a blue phosphor further comprising $Eu^{2+}$.

2. A phosphor having a magnetoplumbite-type crystal structure and comprising at least one element selected from B, Si, P, Ge, Ti, V, Ni, Ta, Nb, Mo, W, Yb, Tm and Bi, the phosphor being shown by the formula $(La_{1-x}Tb_x)(Mg_{1-a}Mn_a)(Al_{11-c}V_c)O_{19}$, wherein x is from 0 to 0.5, a is from 0 to 0.1, and c is from 0.0001 to 0.01.

3. A phosphor having a magnetoplumbite-type crystal structure and comprising at least one element selected from B, Si, P, Ge, Ti, V, Ni, Ta, Nb, Mo, W, Yb, Tm and Bi, the phosphor being shown by the formula $(La_{1-x-y}Tb_xYb_y)(Mg_{1-a}Mn_a)Al_{11}O_{19}$, wherein x is from 0 to 0.5, y is from 0.0001 to 0.1, and a is from 0 to 0.1.

4. A phosphor having a magnetoplumbite-type crystal structure and comprising at least one element selected from B, Si, P, Ge, Ti, V, Ni, Ta, Nb, Mo, W, Yb, Tm and Bi, the phosphor being shown by the formula $(La_{1-x-y}Tb_xSr_y)(Mg_{1-a-b-y}Mn_aZn_b)(Al_{11-c+y}V_c)O_{19}$, wherein x is from 0 to 0.5, y is from 0 to 0.1, a is from 0 to 0.1, b is from 0 to 0.1, and c is from 0.0001 to 0.01.

5. A phosphor having a magnetoplumbite-type crystal structure and comprising at least one element selected from B, Si, P, Ge, Ti, V, Ni, Ta, Nb, Mo, W, Yb, Tm and Bi, the phosphor being shown by the formula $(La_{1-x-y-z}Tb_xYb_yGd_z)(Mg_{1-a}Mn_a)Al_{11}O_{19}$, wherein x is from 0 to 0.5, y is from 0.0001 to 0.1, z is from 0.00001 to 0.1, and a is from 0 to 0.1.

6. A phosphor having a magnetoplumbite-type crystal structure and comprising at least one element selected from B, Si, P, Ge, Ti, V, Ni, Ta, Nb, Mo, W, Yb, Tm and Bi, the phosphor being shown by the formula $(La_{1-x-y-z}Tb_xYb_yGd_z)(Mg_{1-a-b}Mn_aTi_b)Al_{11}O_{19}$, wherein x is from 0 to 0.5, y is from 0.0001 to 0.1, z is from 0.00001 to 0.1, a is from 0 to 0.1, and b is from 0.00001 to 0.03.

7. A phosphor having a magnetoplumbite-type crystal structure and comprising at least one element selected from B, Si, P, Ge, Ti, V, Ni, Ta, Nb, Mo, W, Yb, Tm and Bi, the phosphor being shown by the formula $(La_{1-x-y}Eu_xTm_y)Mg_{1-x}Al_{11+x}O_{19}$, wherein x is from 0.001 to 0.15 and y is from 0.0001 to 0.1.

8. A phosphor having a magnetoplumbite-type crystal structure and showing by the formula $(La_{1-x-y-z}Tb_xYb_yLn_z)(Mg_{1-a-b}M_aM'_b)Al_{11}O_{19+d}$, wherein x is from 0 to 0.5, y is from 0.0001 to 0.1, z is from 0.00001 to 0.1, a is from 0 to 0.1, b is from 0.00001 to 0.03, d is from —1 to 1, Ln is a rare-earth element or an element that can form a cation with an ionic radius of 1 to 1.4 angstroms, and M and M' are each an element that can form a cation with an ionic radius of 0.7 to 1 angstrom, which is typified by a 3d transition metal.

9. A display device using a green phosphor as set forth in claim 8.

10. A gas discharge device using a green phosphor as set forth in claim 8.

* * * * *

UNITED STATES PATENT AND TRADEMARK OFFICE
CERTIFICATE OF CORRECTION

| | |
|---|---|
| PATENT NO. | : 7,300,605 B2 |
| APPLICATION NO. | : 11/089351 |
| DATED | : November 27, 2007 |
| INVENTOR(S) | : Shinya Fukuta et al. |

It is certified that error appears in the above-identified patent and that said Letters Patent is hereby corrected as shown below:

Col. 15, line 43, delete "ais" and insert --a is--.

Signed and Sealed this

Sixth Day of May, 2008

JON W. DUDAS
*Director of the United States Patent and Trademark Office*